United States Patent
Myers

(10) Patent No.: US 11,241,028 B1
(45) Date of Patent: *Feb. 8, 2022

(54) BANANA FOOD

(71) Applicant: Gracienne Myers, Port Matilda, PA (US)

(72) Inventor: Gracienne Myers, Port Matilda, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,890

(22) Filed: Jul. 6, 2020

Related U.S. Application Data

(63) Continuation-in-part of application No. 15/728,730, filed on Oct. 10, 2017, now Pat. No. 10,743,570.

(60) Provisional application No. 62/405,443, filed on Oct. 7, 2016.

(51) Int. Cl.
*A23L 11/00* (2021.01)
*A23L 5/10* (2016.01)
*A23P 30/10* (2016.01)
*A23L 29/00* (2016.01)

(52) U.S. Cl.
CPC ............. *A23L 11/05* (2016.08); *A23L 5/13* (2016.08); *A23L 29/035* (2016.08); *A23P 30/10* (2016.08)

(58) Field of Classification Search
None
See application file for complete search history.

(56) References Cited

U.S. PATENT DOCUMENTS

| | | | |
|---|---|---|---|
| 5,855,688 A * | 1/1999 | Fichtali | C08B 30/04 127/68 |
| 2013/0156893 A1* | 6/2013 | Han | A23L 19/09 426/72 |

OTHER PUBLICATIONS

R&D Editor, The Sticky Challenge of Relative Humidity, R&D World, Dec. 2014, accessed at https://www.rdworldonline.com/author/rd-editors/ (Year: 2014).*

* cited by examiner

*Primary Examiner* — Amber R Orlando
*Assistant Examiner* — Philip A Dubois
(74) *Attorney, Agent, or Firm* — John J. Elnitski, Jr.

(57) ABSTRACT

A banana food made using ripe banana removed from bark and stalk. Cooking and stirring the ripe banana and dried banana as a mash. Adding green banana biomass to partially cooked mash of ripe banana and dried banana and further cooking the mixture of green banana biomass with the mash of ripe banana and dried banana.

10 Claims, No Drawings

BANANA FOOD

This application is a continuation-in-part application of U.S. patent application Ser. No. 15/728,730 filed Oct. 10, 2017.

This application claims the benefit and incorporates by reference U.S. Provisional Application No. 62/405,443 filed Oct. 7, 2016 and U.S. patent application Ser. No. 15/728,730 filed Oct. 10, 2017.

BACKGROUND

The present invention generally relates to a banana food. More specifically, the present invention relates processed banana food.

There are many energy foods on the market. Most of these energy foods are processed with artificial ingredients and contained added sugars for a pleasing taste. The processing of the ingredients can also change the nutritional benefits of the food used. Bananas are nutritional food used by athletes to provide replacement of nutrients and energy. The consumer will eat a ripe banana as opposed to an unripen green banana due to taste, texture and digestibility that a ripe banana has over a green banana. A ripe banana will have a short shelf life of 2 to 7 days, as it deteriorates quickly after it ripens. A ripe banana is not convenient for travel as it can't fit in a pocket and bruises easily. There is also an inconsistency in flavor from banana to banana. A green banana includes nutritional and fiber benefits that are lost when the banana ripens. What is needed is a product that provides the nutritional and fiber benefits of a green banana that has a taste, texture and digestibility similar to a ripe banana. Also what is needed is a product that is shelf stable, convenient, consistent in flavor, portable and resistant to damage.

It is an object of the present invention to provide a banana product that has nutritional and fiber benefits of a green banana with a taste, texture and digestibility similar to a ripe banana.

It is an object of the present invention to provide a banana product that is shelf stable, convenient, consistent in flavor, portable and resistant to damage.

SUMMARY OF THE INVENTION

A banana food made using ripe banana removed from bark and stalk. Cooking and stirring the ripe banana and dried banana as a mash. Adding green banana biomass to partially cooked mash of ripe banana and dried banana and further cooking the mixture of green banana biomass with the mash of ripe banana and dried banana.

DETAILED DESCRIPTION

The present invention is a banana food in the form of an energy bar for banana consumers who need all the nutritional benefits of a ripe banana and green banana, but wants it to be shelf stable, convenient, consistent in flavor and portable. The ripe banana and green banana by themselves does not have the portability, consistency in flavor, long shelf life and all the vitamin and minerals that they would have together.

The main ingredients of the banana food are ripe bananas and green bananas. Ripe bananas typically are Yellow with brown speckles or spots. Ripe bananas are bananas that have matured and are ready for eating without process other than removal of the bark and stalk. Where the bark is commonly referred to the peel and the stalk is the top and bottom tips of the banana. Green bananas usually have a green bark. Green bananas are bananas that have not ripened or matured for harvest. Green bananas have a bitter taste and waxy texture, it contains proteins that limit your body's ability to digest complex carbohydrates if eaten raw.

The banana food is made using the following ingredients and process. Ripe bananas and green bananas are selected for processing. The ripe bananas and green bananas are cleaned by being placed in a tank with Peracetic acid and water. Peracetic acid is an organic compound with the formula $CH_3CO_3H$. The ripe bananas and green bananas are placed in separate tanks of Peracetic for ten to twenty minutes. A range of 0.1 to 0.03 of Peracetic acid per liter of water is used in the tank with ripe bananas and a range of 0.1 to 0.03 of Peracetic acid per liter of water is used in the tank of green bananas.

After cleaning the ripe bananas, the bark and stalk are removed from the ripe banana and placed in an industrial sized steam cooking pot. The ripe bananas are then cooked for about 120 minutes by stirring into a mash, this time may differ depending on the raw material available and the period of the year in which it was harvested. There is no water is added to this mixture of ripe bananas. After cleaning the green bananas, without removing the bark and stalk the green bananas are cooked in an industrial sized pressure cooker at a temperature that can range from 80° C. to 90° C. for a period of 60 minutes. After cooking, the green bananas enter the de-pulping machine, where the machine separates the bark from the fruit automatically and produces the biomass of the green banana.

While the ripe bananas are still cooking after the 120 minutes, the green bananas biomass is added to the ripe banana mixture in the proportion of 7.14% of green banana to 92.86% of ripe banana. The amount of green banana to ripe banana can vary where there is more ripe banana the green banana or more green banana then ripe banana. Citric acid is also added to the mixture at about 90 grams per 300 kilos of the combined ripe bananas and green bananas. The green banana and ripe banana combination is cooked further for another 120 minutes for the mixture to reach a Brix number of at least 80%. Brix is a unit of measure used in a refractometer. When the Brix reading is divided by 2 it will be equal to the percent of crude sucrose n the plant tissue of the banana. The refractometer is a device used to measure the refractive index of plant juices in order to determine the mineral/sugar ratio of the plant cell protoplasm. Once the mixture has reached at least a Brix of 80% or more, the mixture of ripe banana and green banana is now the banana food of the present invention. The banana food mixture is poured into tray's and allowed to rest for period of 24 hours. This is so temperature of the banana food mixture reduces from about 120° C. to the ambient temperature around 23° C. to 25° C. Once the banana food mixture has reached the room temperature around 23° C. to 25° C., the trays are placed in a cold chamber at an average temperature of minus 15° C. Once the banana food mixture has reached rested for 24 hours in the chamber, the banana food mixture will be of an ideal consistency to be cut at a standard size of 30 g bars to form energy bars. After cutting into the banana food mixture into energy bars, the energy bars are packaged.

The benefits of the banana food is that it provides 10 vitamins/minerals, has a 12 Month shelf life, no added sugars, is a fuel source with only 90 calories per 30 g serving size, has a delicious taste and is free of common allergens and inflammatory agents.

A banana food as a snack/energy bar that includes ripe banana, green banana biomass, Dried Bananas and Citric Acid, which retains all of the nutritional values and advantages as for the banana food described above. The optimum proportion of ingredients is 7.14% of the product Green banana biomass 10% of Dried Bananas and 82.86% of ripe banana. The range of any of the ingredients can change by 2 percent, which would require adjustment of the other ingredients. Also the range the amount of ripe banana to green banana can change as much as 5 percent, so if there is 12.14% green banana, there is 77.86% ripe banana. 90 grams of citric acid is added for every 290 kilos of total of the other ingredients. The ripe banana is usually 100% Cavendish Bananas. The ripe banana is sanitized in the wash tank using per-acetic acid. The ripe banana is peeled by removing the stalk and the tips. The Green Banana Biomass production process follows the same sanitization process, but it does not need to peel because the green banana is cooked at a temperature that can vary from 80° C. to 90° C. for a period of 60 minutes, in the same pots of the production of traditional banana bar without added sugar. After cooking, the green bananas enter the pulping machine, where it separates the peel from the fruit automatically and produces the green banana biomass.

First the ripe banana and dried banana is cooked as a mash in a pot for a period of approximately 120 minutes, this time may differ according to the available raw material and the time of year in which the ripe bananas were harvested. Between 80th and 90th minutes of the 120 minute cooking process, the green banana biomass is mixed in the proportion of 7.14%. Also added with the green banana is the citric acid. After the cooking of 120 minutes, the texture of the mixture is evaluated and an additional 20 minutes of baking can be included to parameterize the moisture and water activity of the mixture. In order for the final product to be free from forming mold while on the shelf, the water activity must be no higher than 0.72 at 25° C. The water activity of a food is the ratio between the vapor pressure of the food itself, when in a completely undisturbed balance with the surrounding air media, and the vapor pressure of distilled water under identical conditions. A water activity of 0.80 means the vapor pressure is 80 percent of that of pure water. The water activity increases with temperature. The moisture condition of a product can be measured as the equilibrium relative humidity (ERH) expressed in percentage or as the water activity expressed as a decimal. The 10% of dried bananas added is used avoid the mold and affect the water activity. Most foods have a water activity above 0.95, which provides sufficient moisture to support the growth of bacteria, yeasts, and mold, where 0.72 and lower prevents mold. So if the water activity is above 0.72, the mixture is continued to be cooked until the water activity drops to 0.72 or lower.

After cooking, the mixture is placed in the molds. The mixture remains in the molds for a 24-hour rest period, where the temperature is reduced from (+−) 120° C. to room temperature in a special sterilized climate-controlled storage room to avoid any risk of contamination. The room is optimally kept at 17° C. and having humidity of 50%. The room can be kept at a range of 15-18° C. and humidity of between 30-50%. After the mixture is at room temperature, the mixture placed in the cold room at an average temperature of minus 15° C. for an additional 24 hours to get the ideal cut texture. The cold room can be at a range of between 12-20° C. After the treatment in the cold room, the mixture is cut to a standard size of 30 g.

Other fruit can be added to the ingredients, where the other fruit replaces some or the entire amount of the ripe banana. So the percentage of ripe banana is replaced by the same amount of the other fruit. For example, the other fruit can be Guava.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A method of making a banana food, comprising:
removing ripe banana from bark and stalk;
cooking and stirring the ripe banana and dried banana into a mash; and
adding green banana biomass that has the bark and stalk removed to the mash to form a mixture, while retaining the nutritional value of the ripe banana in the mixture; and
allowing 100 percent of the mixture to cool into a solid food, wherein the green banana is added so that the mixture has at least 90% ripe banana.

2. The method of claim 1, wherein the green banana biomass ripe banana is added between the 80th and 90th minute of the cooking of the ripe banana and dried banana.

3. The method of claim 1, wherein there is 5.14 to 12.14% of said green banana biomass, 10% of Dried Bananas and 84.86 to 77.86% of ripe banana.

4. The method of claim 1, wherein there is 7.14% of green banana biomass 10% of dried bananas and 82.86% of ripe banana.

5. The method of claim 1, further including mixing in Citric acid.

6. The method of claim 4, wherein said Citric acid is added at a rate of 90 grams of citric acid is added for every 290 kilos of total of the other ingredients.

7. The method of claim 1, wherein said mixture further includes a percentage of other fruit to replace an equal amount of ripe banana.

8. The method of claim 1, wherein during cooking, the mixture is check for water activity and the mixture is cooked until the water activity is 0.72 or lower.

9. The method of claim 1, wherein after cooking the mixture in poured into a mold and cooled to a range of 15-18° C. at a humidity of between 30-50%.

10. The method of claim 9, wherein after cooling to between 15-18° C., the mixture is placed in the cold room at a range of temperature of minus 12-20° C. for an additional 24 hours to form a proper cut texture.

* * * * *